United States Patent
Zhang et al.

(10) Patent No.: US 12,335,197 B2
(45) Date of Patent: Jun. 17, 2025

(54) APPARATUS AND METHOD OF RESOURCE MAPPING FOR ENHANCED PDCCH TRANSMISSION WITH MULTIPLE BEAMS FROM MULTIPLE TRPs

(71) Applicant: Lenovo (Beijing) Ltd., Beijing (CN)

(72) Inventors: Yi Zhang, Chao Yang District (CN);
Chenxi Zhu, Haidian District (CN);
Bingchao Liu, Changping District (CN); Wei Ling, Changping (CN);
Lingling Xiao, Haidian District (CN)

(73) Assignee: Lenovo (Beijing) Ltd., Beijing (CN)

( * ) Notice: Subject to any disclaimer, the term of this patent is extended or adjusted under 35 U.S.C. 154(b) by 522 days.

(21) Appl. No.: 17/789,431

(22) PCT Filed: Jan. 3, 2020

(86) PCT No.: PCT/CN2020/070240
§ 371 (c)(1),
(2) Date: Jun. 27, 2022

(87) PCT Pub. No.: WO2021/134780
PCT Pub. Date: Jul. 8, 2021

(65) Prior Publication Data
US 2023/0040433 A1    Feb. 9, 2023

(51) Int. Cl.
*H04W 4/00* (2018.01)
*H04L 1/1812* (2023.01)
(Continued)

(52) U.S. Cl.
CPC .......... *H04L 5/0055* (2013.01); *H04L 1/1812* (2013.01); *H04W 72/20* (2023.01)

(58) Field of Classification Search
CPC .. H04W 72/046; H04W 72/04; H04L 5/0055; H04L 1/1812; H04L 5/00; H04L 1/18
(Continued)

(56) References Cited

U.S. PATENT DOCUMENTS 11,197,288 B2 * 12/2021 Lin ................. H04W 72/23
11,330,576 B2 * 5/2022 Pan ................. H04L 5/0053
(Continued)

FOREIGN PATENT DOCUMENTS

CN       108809505 A      11/2018
CN       109716693 A       5/2019
(Continued)

OTHER PUBLICATIONS

Huawei , et al., "Enhancements on Multi-TRP/panel transmission", 3GPP TSG RAN WG1 #97, R1-1906029, Reno, USA [retrieved Aug. 22, 2022]. Retrieved from the Internet <https://www.3gpp.org/ftp/tsg_ran/WG1_RL1/TSGR1_97/Docs>, May 2019, 17 pages.
(Continued)

*Primary Examiner* — Marceau Milord
(74) *Attorney, Agent, or Firm* — FIG. 1 Patents

(57) ABSTRACT

Apparatus and methods of resource mapping for enhanced PDCCH transmission with multiple beams from multiple TRPs are disclosed. The apparatus includes: a processor that determines transmission resources capable of transmitting Physical Downlink Control Channel (PDCCH) using a Control Resource Set (CORESET) by a plurality of wireless transmitting-receiving identities including a first identity and a second identity; and determines a resource candidate from the transmission resources for transmitting the PDCCH; where the resource candidate includes a first resource group having a first set of Resource Elements (REs) for transmission by the first identity, and a second resource group having a second set of REs for transmission by the second identity; and a transmitter that transmits the PDCCH using the resource candidate.

20 Claims, 8 Drawing Sheets

(51) Int. Cl.
*H04L 5/00* (2006.01)
*H04W 72/20* (2023.01)

(58) Field of Classification Search
USPC ........................................................ 370/329
See application file for complete search history.

(56) References Cited

U.S. PATENT DOCUMENTS

| | | | | |
|---|---|---|---|---|
| 11,528,100 | B2* | 12/2022 | Bhamri | H04L 1/1607 |
| 11,558,762 | B2* | 1/2023 | Tsai | H04W 80/08 |
| 11,683,142 | B2* | 6/2023 | Yu | H04L 5/0023 |
| | | | | 370/329 |
| 11,683,705 | B2* | 6/2023 | You | H04W 72/0453 |
| | | | | 370/329 |
| 11,765,721 | B2* | 9/2023 | Xu | H04W 72/535 |
| | | | | 370/329 |
| 11,825,456 | B2* | 11/2023 | Kim | H04W 80/02 |
| 11,825,491 | B2* | 11/2023 | Pan | H04L 5/0053 |
| 11,863,489 | B2* | 1/2024 | Noh | H04L 27/32 |
| 11,909,694 | B2* | 2/2024 | Gao | H04L 27/2605 |
| 11,916,681 | B2* | 2/2024 | Kim | H04L 1/1812 |
| 11,936,575 | B2* | 3/2024 | Xu | H04W 36/0055 |
| 11,937,264 | B2* | 3/2024 | Noh | H04L 5/0007 |
| 11,943,785 | B2* | 3/2024 | Lin | H04W 72/56 |
| 2018/0288749 | A1* | 10/2018 | Sun | H04L 5/0048 |
| 2020/0154467 | A1* | 5/2020 | Gong | H04W 76/27 |
| 2020/0322822 | A1* | 10/2020 | Tsai | H04W 72/23 |
| 2021/0111839 | A1* | 4/2021 | Bhamri | H04L 5/0055 |
| 2022/0046616 | A1* | 2/2022 | Lin | H04W 72/56 |
| 2022/0158882 | A1* | 5/2022 | Noh | H04W 72/23 |
| 2022/0173850 | A1* | 6/2022 | Xu | H04L 5/0044 |
| 2022/0248380 | A1* | 8/2022 | Pan | H04W 72/04 |
| 2022/0255713 | A1* | 8/2022 | Gao | H04W 72/23 |
| 2022/0294591 | A1* | 9/2022 | Liu | H04L 1/1864 |

FOREIGN PATENT DOCUMENTS

| | | |
|---|---|---|
| CN | 110138500 A | 8/2019 |
| WO | 2018204282 A1 | 11/2018 |
| WO | 2018228487 A1 | 12/2018 |
| WO | 2019244222 A1 | 12/2019 |

OTHER PUBLICATIONS

Huawei, et al., "Remaining details for DL design on multi-TRP/panel transmission for eMBB", 3GPP TSG RAN WG1 #97, R1-1906040, Reno, USA [retrieved Aug. 22, 2022]. Retrieved from the internet <https://www.3gpp.org/ftp/tsg_ran/WG1_RL1/TSGR1_97/Docs>., May 17, 2019, 7 pages.

PCT/CN2020/070240, "International Preliminary Report on Patentability", PCT Application No. PCT/CN2020/070240, Jul. 14, 2022, 6 pages.

PCT/CN2020/070240, "International Search Report and Written Opinion", PCT Application No. PCT/CN2020/070240, Sep. 28, 2020, 7 pages.

20910435.5, "Extended European Search Report", EP Application No. 20910435.5, Aug. 10, 2023, 9 pages.

Takeda, Kazuki, et al., "Understanding the Heart of the 5G Air Interface: An Overview of Physical Downlink Control Channel for 5G New Radio", IEEE Communications Standards Magazine, vol. 4, No. 3 [retrieved Oct. 4, 2023]. Retrieved from the Internet <https://doi.org/10.1109/MCOMSTD.001.1900048>, Sep. 23, 2020, 8 pages.

202080091442.5, "Foreign Office Action", CN Application No. 202080091442.5, Oct. 17, 2024, 14 pages.

* cited by examiner

APPARATUS AND METHOD OF RESOURCE MAPPING FOR ENHANCED PDCCH TRANSMISSION WITH MULTIPLE BEAMS FROM MULTIPLE TRPs

FIELD

The subject matter disclosed herein relates generally to wireless communication and more particularly relates to, but not limited to, apparatus and methods of resource mapping for enhanced Physical Downlink Control Channel (PDCCH) transmission with multiple beams from multiple Transmit and Receive Points (TRPs).

BACKGROUND

The following abbreviations and acronyms are herewith defined, at least some of which are referred to within the specification.

Third Generation Partnership Project (3GPP), 5th Generation (5G), New Radio (NR), 5G Node B/generalized Node B (gNB), Long Term Evolution (LTE), LTE Advanced (LTE-A), E-UTRAN Node B/Evolved Node B (eNB), Universal Mobile Telecommunications System (UMTS), Worldwide Interoperability for Microwave Access (WiMAX), Evolved UMTS Terrestrial Radio Access Network (E-UTRAN), Wireless Local Area Networking (WLAN), Orthogonal Frequency Division Multiplexing (OFDM), Single-Carrier Frequency-Division Multiple Access (SC-FDMA), Downlink (DL), Uplink (UL), User Entity/Equipment (UE), Network Equipment (NE), Radio Access Technology (RAT), Receive or Receiver (RX), Transmit or Transmitter (TX), Physical Downlink Control Channel (PDCCH), Physical Downlink Shared Channel (PDSCH), Physical Uplink Control Channel (PUCCH), Physical Uplink Shared Channel (PUSCH), Control Channel Element (CCE), Control Element (CE), Control Resource Set (CORESET), Cyclic redundancy check (CRC), Downlink Control Information (DCI), Frequency Division Multiple Access (FDMA), Identification (ID), Light Emitting Diode (LED), Media Access Control (MAC), Multiple Input Multiple Output (MIMO), Multi-User MIMO (MU-MIMO), Physical Resource Block (PRB), Quadrature Phase Shift Keying (QPSK), Random-access Memory (RAM), Resource Block (RB), Resource Elements (RE), Resource-Element Group (REG), Reference Signal (RS), Subcarrier Spacing (SCS), Transmit Receive Point (TRP), Ultra Reliable Low Latency Communications (URLLC), Frequency Range 1 (FR1), Frequency Range 2 (FR2), Transmission Configuration Indication (TCI).

In wireless communication, such as a Third Generation Partnership Project (3GPP) mobile network, a wireless mobile network may provide a seamless wireless communication service to a wireless communication terminal having mobility, i.e. user equipment (UE). The wireless mobile network may be formed of a plurality of base stations and a base station may perform wireless communication with the UEs.

The 5G New Radio (NR) is the latest in the series of 3GPP standards which supports very high data rate with lower latency compared to its predecessor LTE (4G) technology. Two types of frequency range (FR) are defined in 3GPP. Frequency of sub-6 GHz range (from 450 to 6000 MHz) is called FR1 and millimeter wave range (from 24.25 GHz to 52.6 GHz) is called FR2. The 5G NR supports both FR1 and FR2 frequency bands.

Enhancements on multi-TRP/panel transmission including improved reliability and robustness with both ideal and non-ideal backhaul between these TRPs are studied. A TRP is an apparatus to transmit and receive signals, and is controlled by a gNB through the backhaul between the gNB and the TRP. A TRP may also be referred to as a wireless transmitting-receiving identity, or simply an identity.

In current NR system, Physical Downlink Control Channel (PDCCH) is transmitted from a single TRP. Additional transmission resources are introduced in spatial domain by different beams from different TRPs, accordingly enhanced transmission for PDCCH with multiple TRPs is desirable, for example, to increase PDCCH capacity and/or to improve PDCCH robustness.

SUMMARY

Apparatus and methods of resource mapping for enhanced PDCCH transmission with multiple beams from multiple TRPs are disclosed.

According to a first aspect, there is provided an apparatus, including: a processor that determines transmission resources capable of transmitting Physical Downlink Control Channel (PDCCH) using a Control Resource Set (CORESET) by a plurality of wireless transmitting-receiving identities including a first identity and a second identity; and determines a resource candidate from the transmission resources for transmitting the PDCCH; where the resource candidate includes a first resource group having a first set of Resource Elements (REs) for transmission by the first identity, and a second resource group having a second set of REs for transmission by the second identity; and a transmitter that transmits the PDCCH using the resource candidate.

According to a second aspect, there is provided an apparatus, including: a receiver that receives transmission resources transmitted in a Control Resource Set (CORESET) from a plurality of wireless transmitting-receiving identities including a first identity and a second identity; and a processor that detects a resource candidate from the transmission resources for Physical Downlink Control Channel (PDCCH) reception; where the resource candidate includes a first resource group having a first set of Resource Elements (REs) received from the first identity, and a second resource group having a second set of REs received from the second identity.

According to a third aspect, there is provided a method, including: determining, by a processor, transmission resources capable of transmitting Physical Downlink Control Channel (PDCCH) using a Control Resource Set (CORESET) by a plurality of wireless transmitting-receiving identities including a first identity and a second identity; determining, by the processor, a resource candidate from the transmission resources for transmitting the PDCCH; and transmitting, by a transmitter, the PDCCH using the resource candidate; where the resource candidate includes a first resource group having a first set of Resource Elements (REs) for transmission by the first identity, and a second resource group having a second set of REs for transmission by the second identity.

According to a fourth aspect, there is provided a method, including: receiving, by a receiver, transmission resources transmitted in a Control Resource Set (CORESET) from a plurality of wireless transmitting-receiving identities including a first identity and a second identity; and detecting, by the processor, a resource candidate from the transmission resources for Physical Downlink Control Channel (PDCCH) reception; where the resource candidate includes a first resource group having a first set of Resource Elements (REs) received from the first identity, and a second resource group having a second set of REs received from the second identity.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which.

DETAILED DESCRIPTION

Figure 1:
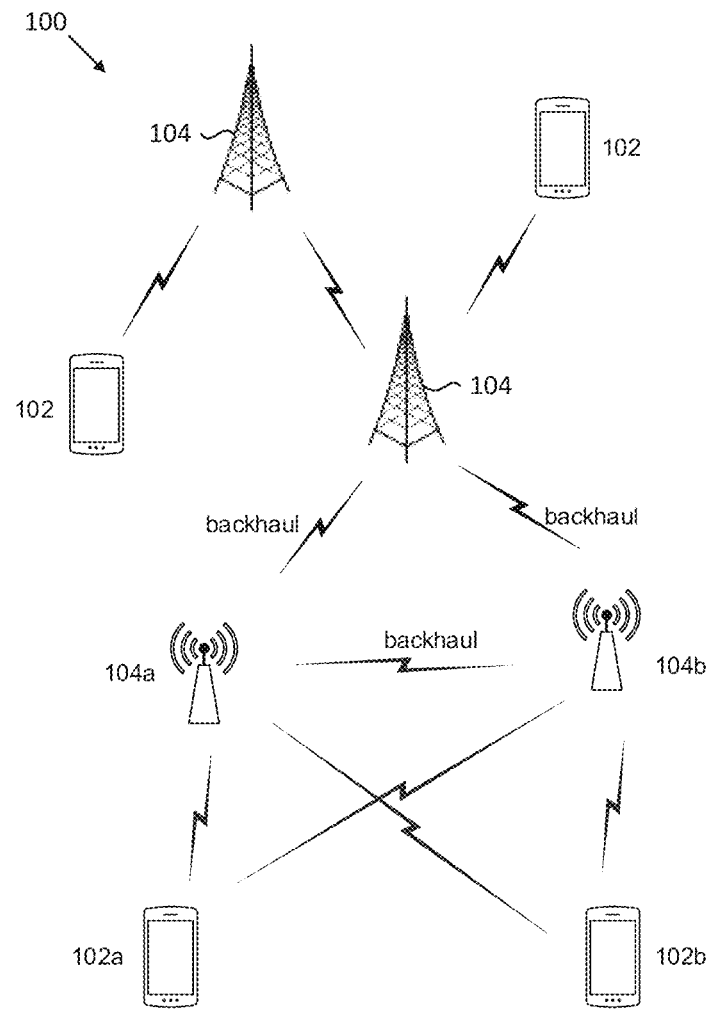
FIG. 1 is a schematic diagram illustrating a wireless communication system in accordance with some implementations of the present disclosure.

As will be appreciated by one skilled in the art, aspects of the embodiments may be embodied as a system, an apparatus, a method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration (VLSI) circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, one or more embodiments may take the form of a program product embodied in one or more computer readable storage devices storing machine readable code, computer readable code, and/or program code, referred to hereafter as "code". The storage devices may be tangible, non-transitory, and/or non-transmission.

Any combination of one or more computer readable media may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory (RAM), a read-only memory (ROM), an erasable programmable read-only memory (EPROM, or Flash memory), a portable Compact Disc Read-Only Memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment," "an embodiment," "an example," "some embodiments," "some examples," or similar language means that a particular feature, structure, or characteristic described is included in at least one embodiment or example. Thus, instances of the phrases "in one embodiment," "in an example," "in some embodiments," and similar language throughout this specification may, but do not necessarily, all refer to the same embodiment(s). It may or may not include all the embodiments disclosed. Features, structures, elements, or characteristics described in connection with one or some embodiments are also applicable to other embodiments, unless expressly specified otherwise. The terms "including", "comprising", "having", and variations thereof mean "including but not limited to", unless expressly specified otherwise.

An enumerated listing of items does not imply that any or all of the items are mutually exclusive, unless expressly specified otherwise. The terms "a", "an", and "the" also refer to "one or more" unless expressly specified otherwise.

Throughout the disclosure, the terms "first", "second", "third", and etc. are all used as nomenclature only for references to relevant devices, components, procedural steps, and etc. without implying any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed after, or simultaneously with, a "second step".

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of various embodiments are described below with reference to schematic flowchart diagrams and/or schematic block diagrams of methods, apparatuses, systems, and program products. It will be understood that each block of the schematic flowchart diagrams and/or schematic block diagrams, as well as combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions executed via the processor of the computer or other programmable data processing apparatus create a means for implementing the functions or acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function or act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions or acts specified in the schematic flowchart diagrams and/or schematic block diagram.

The schematic flowchart diagrams and/or schematic block diagrams in the Figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like-numbers refer to like-elements in all figures, including alternate embodiments of like-elements.

FIG. 1 is a schematic diagram illustrating a wireless communication system. It depicts an embodiment of a wireless communication system 100. In one embodiment, the wireless communication system 100 may include a user equipment (UE) 102 and a network equipment (NE) 104. Even though a specific number of UEs 102 and NEs 104 is depicted in FIG. 1, one skilled in the art will recognize that any number of UEs 102 and NEs 104 may be included in the wireless communication system 100.

The UEs 102 may be referred to as remote devices, remote units, subscriber units, mobiles, mobile stations, users, terminals, mobile terminals, fixed terminals, subscriber stations, user terminals, apparatus, devices, or by other terminology used in the art.

In one embodiment, the UEs 102 may be autonomous sensor devices, alarm devices, actuator devices, remote control devices, or the like. In some other embodiments, the UEs 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the UEs 102 include wearable devices, such as smart watches, fitness bands, optical head-mounted displays, or the like. The UEs 102 may communicate directly with one or more of the NEs 104.

The NE 104 may also be referred to as a base station, an access point, an access terminal, a base, a Node-B, an eNB, a gNB, a Home Node-B, a relay node, an apparatus, a device, or by any other terminology used in the art. Throughout this specification, a reference to a base station may refer to any one of the above referenced types of the network equipment 104, such as the eNB and the gNB.

The NEs 104 may be distributed over a geographic region. The NE 104 is generally part of a radio access network that includes one or more controllers communicably coupled to one or more corresponding NEs 104. The radio access network is generally communicably coupled to one or more core networks, which may be coupled to other networks, like the Internet and public switched telephone networks. These and other elements of radio access and core networks are not illustrated, but are well known generally by those having ordinary skill in the art.

In one implementation, the wireless communication system 100 is compliant with a 3GPP 5G new radio (NR). In some implementations, the wireless communication system 100 is compliant with a 3GPP protocol, where the NEs 104 transmit using an OFDM modulation scheme on the DL and the UEs 102 transmit on the uplink (UL) using a SC-FDMA scheme or an OFDM scheme. More generally, however, the wireless communication system 100 may implement some other open or proprietary communication protocols, for example, WiMAX. The present disclosure is not intended to be limited to the implementation of any particular wireless communication system architecture or protocol.

The NE 104 may serve a number of UEs 102 within a serving area, for example, a cell (or a cell sector) or more cells via a wireless communication link. The NE 104 transmits DL communication signals to serve the UEs 102 in the time, frequency, and/or spatial domain.

Communication links are provided between the NE 104 and the UEs 102a, 102b, 102c, and 102d, which may be NR UL or DL communication links, for example. Some UEs 102 may simultaneously communicate with different Radio Access Technologies (RATs), such as NR and LTE.

Direct or indirect communication link between two or more NEs 104 may be provided.

The NE 104 may also include one or more transmit receive points (TRPs) 104a. In some embodiments, the network equipment may be a gNB 104 that controls a number of TRPs 104a. In addition, there is a backhaul between two TRPs 104a. In some other embodiments, the network equipment may be a TRP 104a that is controlled by a gNB.

Communication links are provided between the NEs 104, 104a and the UEs 102, 102a, respectively, which, for example, may be NR UL/DL communication links. Some UEs 102, 102a may simultaneously communicate with different Radio Access Technologies (RATs), such as NR and LTE.

In some embodiments, the UE 102a may be able to communicate with two or more TRPs 104a that utilize a non-ideal backhaul, simultaneously. A TRP may be a transmission point of a gNB. Multiple beams may be used by the UE and/or TRP(s). The two or more TRPs may be TRPs of different gNBs, or a same gNB.

Figure 2:
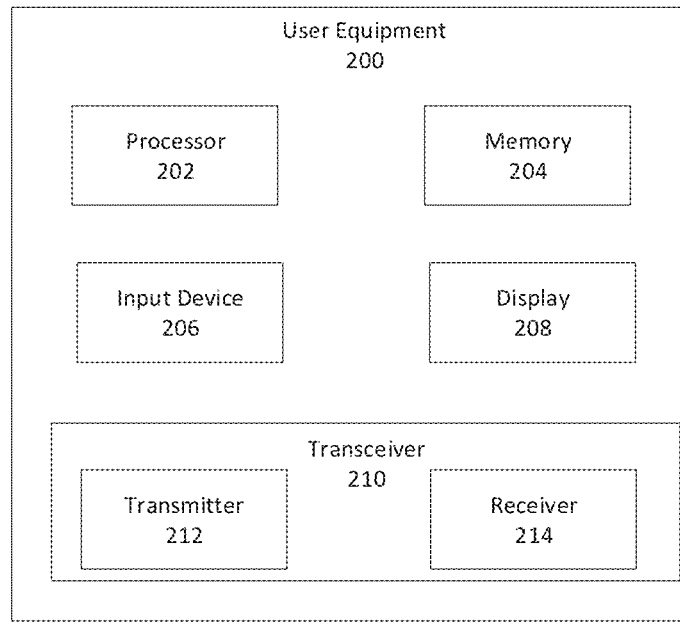
FIG. 2 is a schematic block diagram illustrating components of user equipment (UE) in accordance with some implementations of the present disclosure.

FIG. 2 is a schematic block diagram illustrating components of user equipment (UE) according to one embodiment. A UE 200 may include a processor 202, a memory 204, an input device 206, a display 208, and a transceiver 210. In some embodiments, the input device 206 and the display 208 are combined into a single device, such as a touchscreen. In certain embodiments, the UE 200 may not include any input device 206 and/or display 208. In various embodiments, the UE 200 may include one or more processors 202 and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204 and the transceiver 210.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to trigger conditions for transmitting the measurement report to the network equipment. In some embodiments, the memory 204 also stores program code and related data.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audio, and/or haptic signals. In some embodiments, the display 208 includes an electronic display capable of outputting visual data to a user. For example, the display 208 may include, but is not limited to, an LCD display, an LED display, an OLED display, a projector, or a similar display device capable of outputting images, text, or the like to a user. As another non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audio alert or notification (e.g., a beep or chime). In some embodiments, the display 208 includes one or more haptic devices for producing vibrations, motion, or other haptic feedback. In some embodiments, all or a portion of the display 208 may be integrated with the input device 206. For example, the input device 206 and the display 208 may form a touchscreen or a similar touch-sensitive display. In other embodiments, the display 208 may be located near the input device 206.

The transceiver 210, in one embodiment, is configured to communicate wirelessly with the network equipment. In certain embodiments, the transceiver 210 comprises a transmitter 212 and a receiver 214. The transmitter 212 is used to transmit UL communication signals to the network equipment and the receiver 214 is used to receive DL communication signals from the network equipment.

The transmitter 212 and the receiver 214 may be any suitable type of transmitters and receivers. Although only one transmitter 212 and one receiver 214 are illustrated, the transceiver 210 may have any suitable number of transmitters 212 and receivers 214. For example, in some embodiments, the UE 200 includes a plurality of the transmitter 212 and the receiver 214 pairs for communicating on a plurality of wireless networks and/or radio frequency bands, with each of the transmitter 212 and the receiver 214 pairs configured to communicate on a different wireless network and/or radio frequency band.

Figure 3:
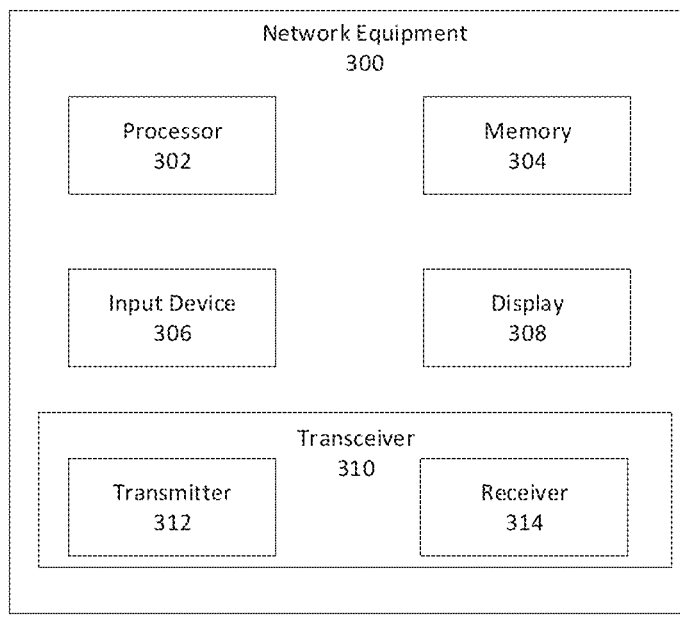
FIG. 3 is a schematic block diagram illustrating components of network equipment (NE) in accordance with some implementations of the present disclosure.

FIG. 3 is a schematic block diagram illustrating components of network equipment (NE) 300 according to one embodiment. The NE 300 may include a processor 302, a memory 304, an input device 306, a display 308, and a transceiver 310. As may be appreciated, in some embodiments, the processor 302, the memory 304, the input device 306, the display 308, and the transceiver 310 may be similar to the processor 202, the memory 204, the input device 206, the display 208, and the transceiver 210 of the UE 200, respectively.

In some embodiments, the processor 302 controls the transceiver 310 to transmit DL signals or data to the UE 200. The processor 302 may also control the transceiver 310 to receive UL signals or data from the UE 200. In another example, the processor 302 may control the transceiver 310 to transmit DL signals containing various configuration data to the UE 200, as described above.

The transceiver 310, in one embodiment, is configured to communicate wirelessly with the UE 200. In certain embodiments, the transceiver 310 comprises a transmitter 312 and a receiver 314. The transmitter 312 is used to transmit DL communication signals to the UE 200 and the receiver 314 is used to receive UL communication signals from the UE 200.

The transceiver 310 may communicate simultaneously with a plurality of UEs 200. For example, the transmitter 312 may transmit DL communication signals to the UE 200. As another example, the receiver 314 may simultaneously receive UL communication signals from the UE 200. The transmitter 312 and the receiver 314 may be any suitable type of transmitters and receivers. Although only one transmitter 312 and one receiver 314 are illustrated, the transceiver 310 may have any suitable number of transmitters 312 and receivers 314. For example, the NE 300 may serve multiple cells and/or cell sectors, where the transceiver 310 includes a transmitter 312 and a receiver 314 for each cell or cell sector.

Figure 4:
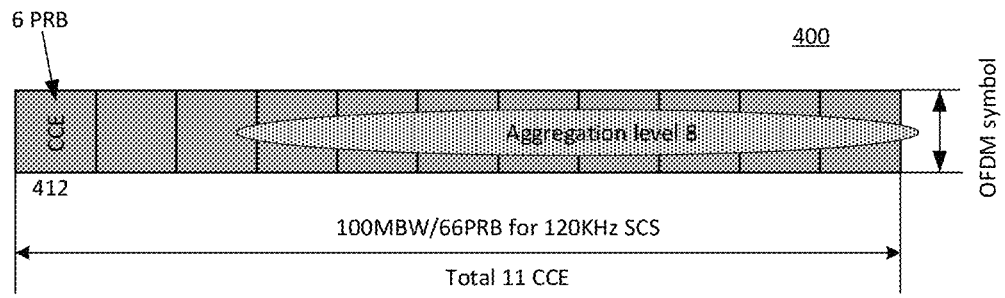
FIG. 4 is a schematic diagram illustrating limited PDCCH resource for high aggregation level UE in the case of small bandwidth configuration in accordance with some implementations of the present disclosure.

FIG. 4 is a schematic diagram illustrating limited PDCCH resource for high aggregation level UE in the case of small bandwidth configuration in accordance with some implementations of the present disclosure. In current NR system, Physical Downlink Control Channel (PDCCH) is transmitted from a single transceiver point (TRP). PDCCH capacity is limited for the case of small bandwidth configuration or more scheduled users by MU-MIMO. As shown in FIG. 4, which is one example of a typical PDCCH configuration for FR2, a control resource set (CORESET) 400 has eleven (11) CCEs 412 in one OFDM symbol for 100 M bandwidth and 120K subcarrier spacing (SCS), which is able to support aggregation level 8 UE. This is not able to support aggregation level 16 UE with the CORESET 400 of one OFDM symbol. That is, the PDCCH resource is insufficient for aggregation level 16 UE because there are only 11 CCEs. In addition, the reliability of PDCCH may be further enhanced for Ultra Reliable Low Latency Communications (URLLC) scenario, where enhancement for Physical Downlink Shared Channel (PDSCH) has already been made with multiple TRP transmission.

Enhanced transmission for PDCCH with multiple TRPs is one topic for Release 17 enhanced Multiple Input Multiple Output (MIMO) work item. Additional transmission resources are introduced in spatial domain by different beams from different TRPs, which may be used to increase PDCCH capacity and/or improve PDCCH robustness. With additional transmission resources, the resource mapping scheme should extend from time-frequency two-dimension mapping to time-frequency-spatial three-dimension mapping. Furthermore, the designed three-dimension resource mapping should be compatible with the available PDCCH structure, where Resource Element Group (REG) and Control Channel Element (CCE) are defined as basic transmission units.

Some optimized three-dimension resource mapping schemes are proposed based on the available PDCCH structure, which can efficiently exploit the additional resources for high spectrum efficiency and achieve time, frequency and spatial domain diversity for robust PDCCH transmission.

Figure 5:
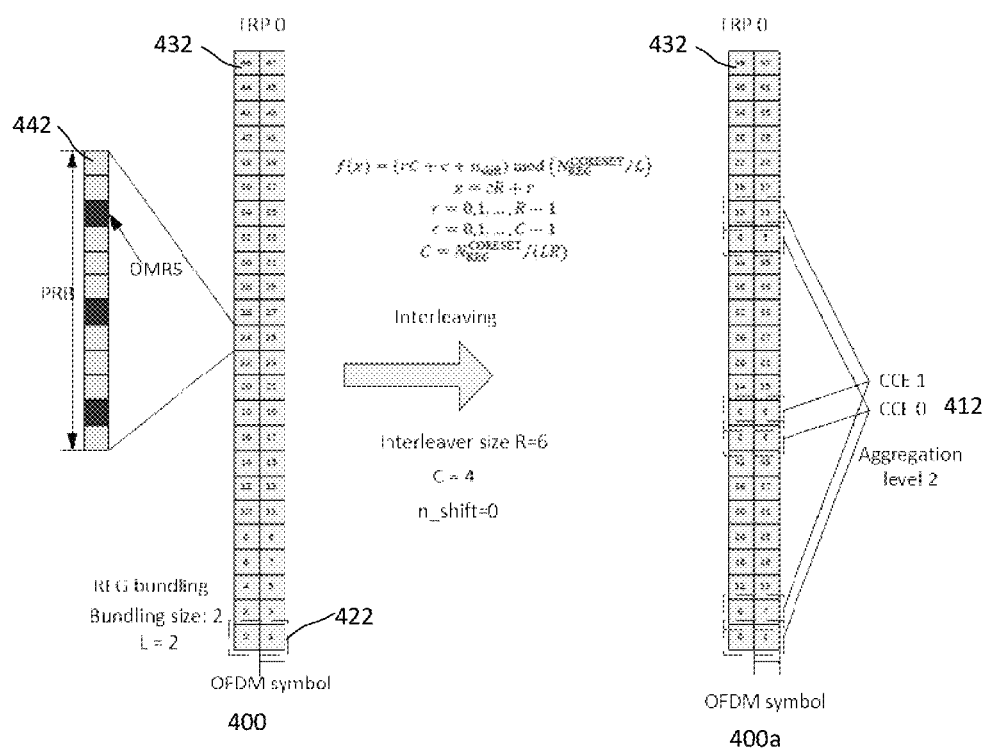
FIG. 5 is a schematic diagram illustrating an example of PDCCH resource mapping for a single TRP with interleaving in accordance with some implementations of the present disclosure.

FIG. 5 is a schematic diagram illustrating an example of PDCCH resource mapping for a single TRP with interleaving in accordance with some implementations of the present disclosure. In Release 15, elaborate resource mapping scheme is specified for PDCCH. In detail, for one UE, it can be configured with multiple control resource sets (CORESETs), where each control resource set consists of $N_{RB}^{CORESET}$ resource blocks in the frequency domain and $N_{symb}^{CORESET} \in \{1,2,3\}$ symbols in the time domain. Transmission resources in one CORESET 400 are split into multiple REGs 432, each of which equals to one resource block (RB, or PRB) within one OFDM symbol. A REG or PRB further consists of 12 Resource Elements (REs) 442. The REGs 432 within a CORESET are numbered in increasing order firstly in the time domain then in the frequency domain. Six REGs form a Control Channel Element (CCE) 412, and one or more CCEs could be aggregated for one PDCCH transmission. The supported aggregation level is shown in Table 1 below.

TABLE 1

Supported PDCCH aggregation levels.

| Aggregation level | Number of CCEs |
|---|---|
| 1 | 1 |
| 2 | 2 |
| 4 | 4 |
| 8 | 8 |
| 16 | 16 |

As shown in FIG. 5, the CORESET 400 consists of 24 PRBs and 2 OFDM symbols. There are totally 48 REGs 432 in this CORESET. One PDCCH with aggregation level 2 uses 2 CCEs 412 for transmission, where each CCE 412 consists of 6 REGs 432. In this mapping scheme, only time-frequency two-dimension resource mapping is specified. It cannot support PDCCH transmission from multiple TRPs, and thus resource mapping for spatial domain, e.g., resource mapping for different beams/TRPs, is not specified.

Each CORESET is associated with one CCE-to-REG mapping only. It may be in an interleaved or a non-interleaved mode. When the interleaved mode is configured, as shown in FIG. 5, REGs 432 of the interleaved CORESET 400a are interleaved with row-column interleaver based on the interleave size defined by a high layer configured value interleaverSize. The granularity for interleaving unit is one REG bundle 422, which may also be named as REG bundling group, where the bundling size is defined by a higher layer configured value reg-BundleSize. In this disclosure, the terms "REG bundle" and "REG bundling group" may be used interchangeably but with the same meaning.

In the example shown in FIG. 5, the REG bundling size, i.e. L, is 2 and the interleaver size is, i.e. R, is 6. Thus, one CCE consists of 6 REGs which are from 3 interleaved REG bundling groups. In detail, CCE 0 consists of interleaved REG bundling groups that are formed by REGs {0, 1}, {2, 3}, and {4, 5}. CCE 1 consists of interleaved REG bundling groups that are formed by REGs {6, 7}, {8, 9}, and {10, 11}. Other values of REG bundling size L and interleaver size R are also possible. For example, L may also be 3 or 6.

When the non-interleaved mode is configured, the REGs are not interleaved and the REG bundling size is fixed as 6. Interleaving is well designed in time-frequency domain in Release 15. At least some of the proposed resource mapping schemes are compatible with this two-dimension interleaving scheme.

Some new resource mapping schemes with one PDCCH transmitted on time-frequency resource from multiple beams/TRPs are proposed in the disclosure. Time-frequency and spatial diversity may be achieved with the proposed three-dimension resource mapping schemes to guarantee robust PDCCH transmission. Furthermore, spectrum efficiency may be improved with PDCCH transmission from multiple beams/TRPs simultaneously. The proposed three-dimension resource mapping schemes may increase PDCCH capacity and support more scheduled UEs and/or UE with higher aggregation level. In addition, they may be compatible with PDCCH structure specified in Release 15.

One PDCCH may be transmitted to a UE 102a from multiple TRPs 104a and 104b, as shown in FIG. 1. At the transmitter side (i.e., the TRPs), the common PDCCH transmission procedure is used. After information element multiplexing, cyclic redundancy check (CRC) attachment, Polar coding and rate matching, the coded dynamic signaling information (DCI) bits are scrambled and then undergoes Quadrature Phase Shift Keying (QPSK) modulation. The modulated symbols will be input to the proposed resource mapper and map to time-frequency resources from multiple TRPs. Further, the modulated symbols mapped to each TRP may be from one channel coding chain or repetition of a channel coding chain. After that, OFDM signal is generated for transmission. For the resource mapping, different schemes may be used based on PDCCH transmit unit of different granularities, including REG, REG bundling group, CCE, or RE.

REG Level Three-Dimension Resource Mapping

Figure 6A:
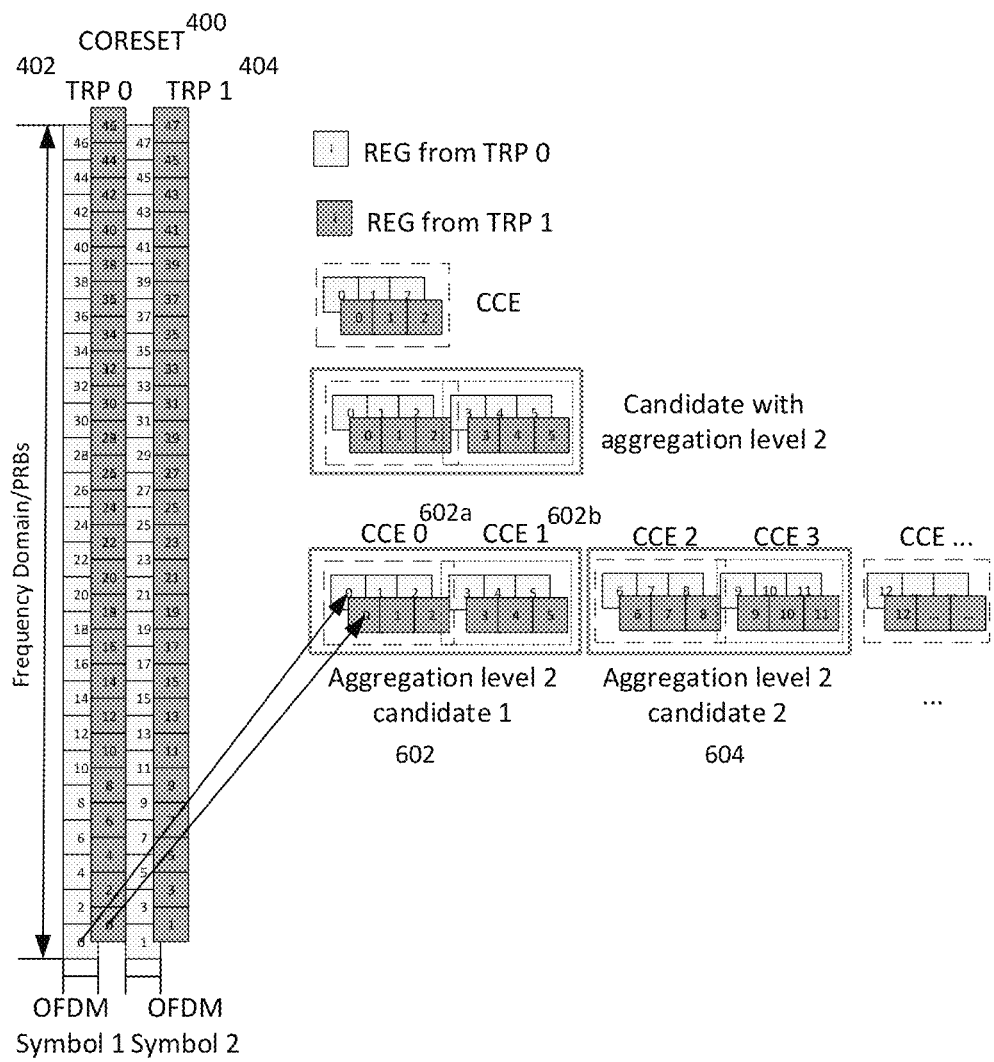
FIG. 6A is a schematic diagram illustrating an example of Resource Element Group (REG) level three-dimension resource mapping in accordance with some implementations of the present disclosure.
Figure 6B:
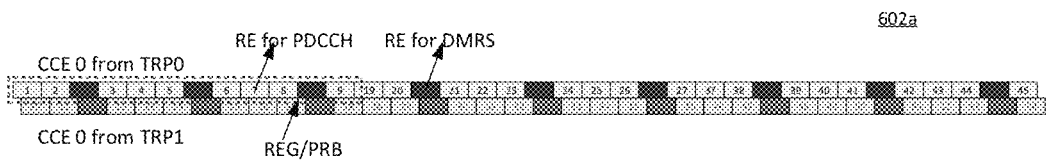
FIG. 6B is a schematic diagram illustrating an example of RE/symbol mapping for REG level three-dimension resource mapping in accordance with some implementations of the present disclosure.

FIG. 6A is a schematic diagram illustrating an example of REG level three-dimension resource mapping in accordance with some implementations of the present disclosure; and FIG. 6B is a schematic diagram illustrating an example of RE/symbol mapping for REG level three-dimension resource mapping.

As shown in FIG. 6A, the CORESET 400 includes a first set of resources 402 for transmission from TRP 0, and a second set of resources 404 for transmission from TRP 1. Each set of resources includes a plurality of REGs. Each REG may be associated with an identification number, or an REG ID, from 0 to 47 as shown.

The REGs may be bundled together into REG bundles or REG bundling groups, and each REG bundle may also be associated with another identification number, or an REG Bundle ID, which may range from 0 to 23 for example.

Each CCE may include six REGs, or three REG bundles, and may be associated with a further identification number, or a CCE ID, which may range from 0 to 8 for example. Some examples of CCEs are shown as CCE 0 602a, CCE 1 602b, CCE 2, and etc.

Based on an aggregation level, a preset number of CCEs may be grouped together to form a resource candidate. In this example, the aggregation level is two, and thus each resource candidate includes two CCEs. For example, resource candidate 1 602 comprises CCE 0 602a, and CCE 1 602b.

In the example shown in FIG. 6A, modulated symbols for PDCCH are mapped to resources with REG as the basic granularity. The resource mapping order in this example is firstly in an increasing order of REG identification number from multiple beams/TRPs, e.g., REG 0 from TRP 0, followed by REG 0 from TRP 1; subsequently, in an increasing order of REG in a REG bundling group, e.g., two REG 0s followed by two REG 1s, and etc.; then, in an increasing order of REG bundling group of a CCE, e.g., REG bundle 0 for transmission from one TRP (e.g., REG 0 and REG 1 of TRP 0, and/or REG0 and REG 1 of TRP 1), followed by REG bundle 1 for transmission from the TRP (e.g. REG 2 and REG 3 of TRP 0, and/or REG 2 and REG 3 of TRP 1), and etc.; and lastly, in an increasing order of CCE identification number, e.g., CCE 0 followed by CCE 1, CCE2, and etc.

In this example, REGs 0-2 from TRP 0 and REGs 0-2 from TRP 1 constitute CCE 0 602a. REGs 3-5 from TRP 0 and REGs 3-5 from TRP 1 constitute CCE 1 602b. Both CCE 0 and CCE 1 are used together for one PDCCH candidate 602 with aggregation level 2. Thus, time-frequency resources from multiple TRPs are used for each PDCCH candidate transmission to achieve spatial, time, frequency domain diversity.

For RE concatenation, REG serves as the basic granularity, as shown in FIG. 6B. The top row of boxes shows REs from TRP 0 and the bottom row of boxes shows REs from TRP 1. For example, the first REG of TRP 0, i.e. REG 0, consists of REs 1 to 9 and three REs for Demodulation Reference Signal (DMRS) as enclosed in the box with dotted lines. The second REG of TRP 0, i.e. REG 1, consists of REs 10 to 27 and another three REs for DMRS. The two rows in FIG. 6B together show all REs in CCE 0 602a.

In sum, REGs are concatenated according to: a first level with a REG of TRP 0 and a REG of TRP1; a second level with REG 0 and REG 1 from a REG bundling group; a third level with REG bundling groups 0, 1, and 2 from a CCE; and a last level with CCE 0, CCE 1, and etc.

REG Bundling Group Level Three-Dimension Resource Mapping

Figure 7A:
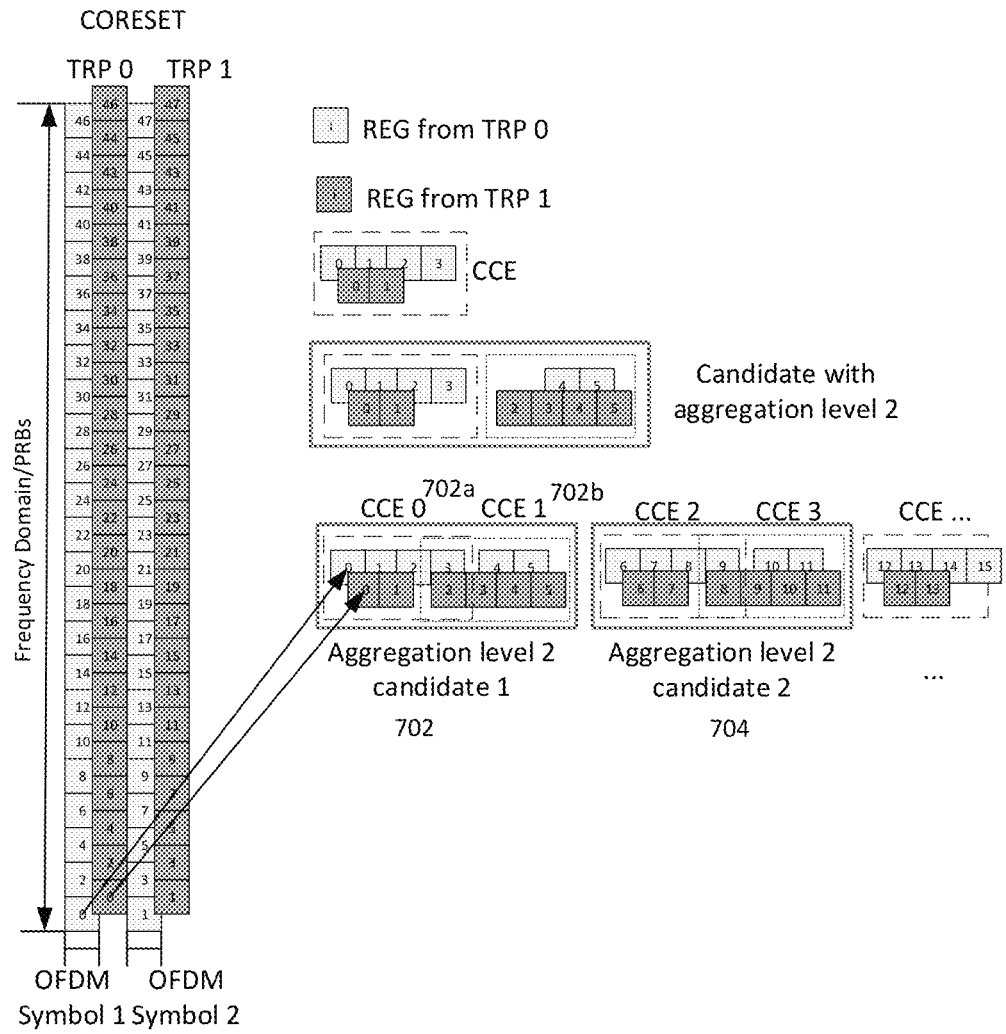
FIG. 7A is a schematic diagram illustrating an example of REG bundling group level three-dimension resource mapping in accordance with some implementations of the present disclosure.
Figure 7B:
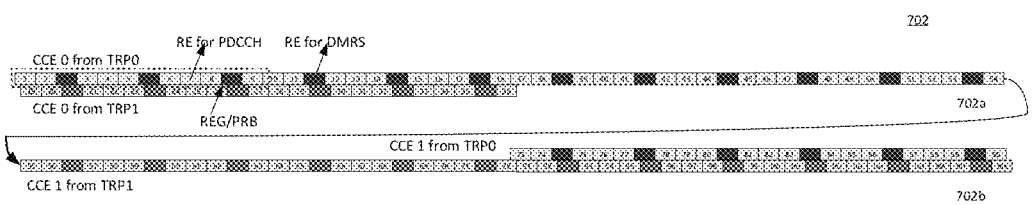
FIG. 7B is a schematic diagram illustrating an example of RE/symbol mapping for REG bundling group level three-dimension resource mapping in accordance with some implementations of the present disclosure.

FIG. 7A is a schematic diagram illustrating an example of REG bundling group level three-dimension resource mapping in accordance with some implementations of the present disclosure; and FIG. 7B is a schematic diagram illustrating an example of RE/symbol mapping for REG bundling group level three-dimension resource mapping.

In the example shown in FIG. 7A, modulated symbols for PDCCH are mapped to resources with REG bundling group as the basic granularity. The resource mapping order is firstly in an increasing order of REG bundling group from multiple beams/TRPs, then in an increasing order of REG bundling group of a CCE, and lastly in an increasing order of CCE identification number.

In this example, REGs 0-3 from TRP 0 and REGs 0-1 from TRP 1 constitute CCE0 702a. REGs 4-5 from TRP 0 and REGs 2-5 from TRP 1 constitute CCE 1 702b. Both CCE 0 and CCE 1 are used together for one PDCCH candidate 702 with aggregation level 2. Resource candidate 704 is mapped to REGs in a similar manner. Thus, time-frequency resources from multiple TRPs are used for each PDCCH candidate transmission to achieve spatial, time, frequency domain diversity.

For RE concatenation, REG bundling group, or REG bundle, serves as the basic granularity. As shown in FIG. 7B, the first part shows REs in CCE 0 702a of the resource candidate 702 and the second part shows REs in CCE 1 702b of the resource candidate 702. In each part, the top row of boxes shows REs for transmission from TRP 0 and the bottom row of boxes shows REs for transmission from TRP 1. The two rows of the first part together show all REs in CCE 0 702a. In sum, REG bundling groups are concatenated according to: a first level with a REG bundling group of TRP 0 and a REG bundling group of TRP1 (here, the REG bundling size is 2 for this example), a second level with REG bundling groups 0, and 1 from a CCE and a last level with CCE 0, CCE 1, and etc.

CCE Level Three-Dimension Resource Mapping

Figure 8A:
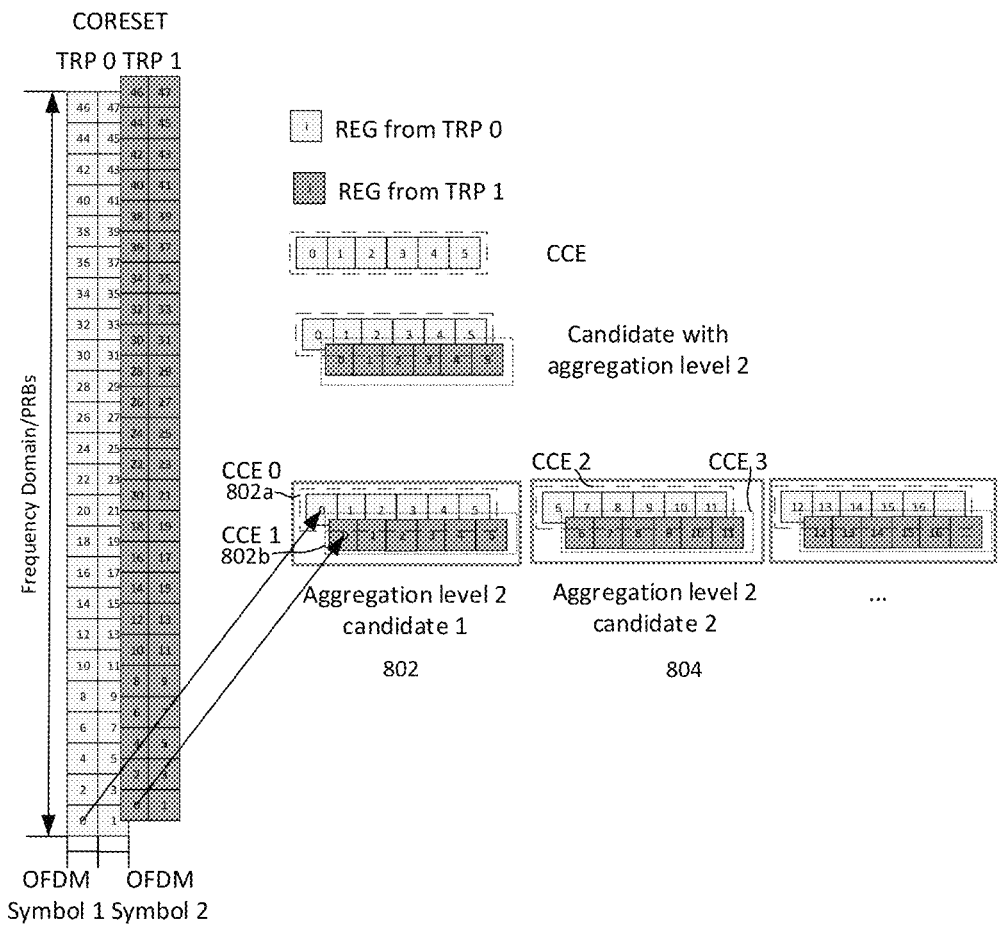
FIG. 8A is a schematic diagram illustrating an example of Control Channel Element (CCE) level three-dimension resource mapping in accordance with some implementations of the present disclosure.
Figure 8B:
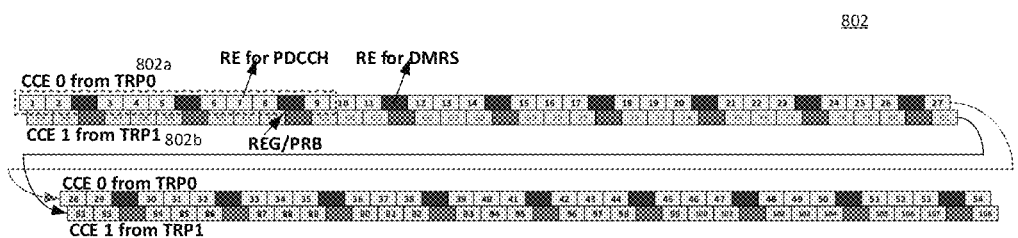
FIG. 8B is a schematic diagram illustrating an example of RE/symbol mapping for CCE level three-dimension resource mapping in accordance with some implementations of the present disclosure.

FIG. 8A is a schematic diagram illustrating an example of CCE level three-dimension resource mapping in accordance with some implementations of the present disclosure; and FIG. 8B is a schematic diagram illustrating an example of RE/symbol mapping for CCE level three-dimension resource mapping.

In the example shown in FIG. 8A, modulated symbols for PDCCH are mapped to resources with CCE as the basic granularity. The resource mapping order is firstly in an increasing order of CCE from multiple beams/TRPs, then in an increasing order of CCE identification number.

In this example, REGs 0-5 from TRP 0 constitute CCE 0 802a; and REGs 0-5 from TRP 1 constitute CCE 1 802b. Both CCE 0 and CCE 1 are used together for one PDCCH candidate 802 with aggregation level 2. Resource candidate 804 is mapped to REGs in a similar manner. Thus, time-frequency resources from multiple TRPs are used for each PDCCH candidate transmission to achieve spatial, time, frequency domain diversity.

For RE concatenation, CCE serves as the basic granularity. As shown in FIG. 8B, the first part shows REGs 0-2 in CCE 0 and REGs 0-2 in CCE 1; and the second part shows REGs 3-5 in CCE 0 and REGs 3-5 in CCE 1. The top rows of the two parts together show CCE 0 802a, or REs for transmission from TRP 0 and the bottom rows of the two parts together show CCE 1 802b, or REs for transmission from TRP 1. In sum, CCEs are concatenated according to: a first level with a CCE of TRP 0 and a CCE of TRP 1, and a second level with CCE 0, CCE 1, and etc.

The above disclosed resource mapping schemes, in REG level, REG bundling group level and/or CCE level, may be compatible with both interleaved and non-interleaved configurations. On account of limited performance gain from complex interleaving, interleaving can be made independently within resource from each TRP with well-designed interleaving scheme specified in Release 15.

RE Level Three-Dimension Resource Mapping

In some other examples of the disclosure, modulated symbols for PDCCH may be mapped to resources with RE as the basic granularity. The resource mapping order is: firstly, in an increasing order of a RE from multiple beams/ TRPs; next, in an increasing order of RE in a REG; subsequently, in an increasing order of REG in a REG bundling group; next, in an increasing order of REG bundling group of a CCE; and lastly, in an increasing order of CCE.

Activation of Enhanced PDCCH Transmission

Figure 9A:
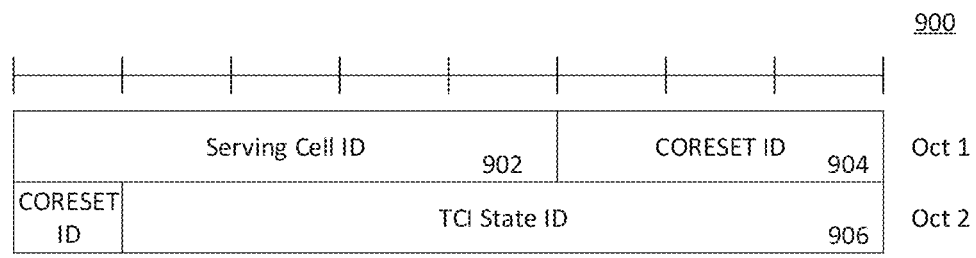
FIG. 9A is a schematic diagram illustrating an example of TCI State Indication for UE-specific PDCCH Media Access Control (MAC) Control Element (CE) for a single TRP in accordance with some implementations of the present disclosure.
Figure 9B:
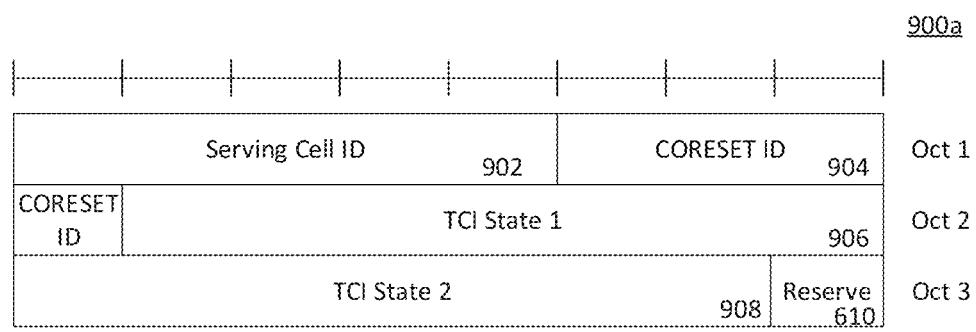
FIG. 9B is a schematic diagram illustrating an example of TCI State Indication for UE-specific PDCCH MAC CE in the case of enhanced PDCCH transmission in accordance with some implementations of the present disclosure.

FIG. 9A is a schematic diagram illustrating an example of TCI State Indication for UE-specific PDCCH Media Access Control (MAC) Control Element (CE) for a single TRP; and FIG. 9B is a schematic diagram illustrating an example of TCI State Indication for UE-specific PDCCH MAC CE in the case of enhanced PDCCH transmission with at least one of the above disclosed resource mapping schemes.

For PDCCH transmission with multiple TRPs, it needs support from UE capability. In detail, for FR2, multiple panels at the UE side are required to receive enhanced PDCCHs transmitted with different beams from multiple TRPs. For FR1, multiple receivers are also required to receive enhanced PDCCHs transmitted with different beams from multiple TRPs. Furthermore, the UE may switch off some panels according to its requirement, e.g., power saving. A gNB needs to decide whether to activate the proposed PDCCH transmission scheme according to the actual conditions, such as the UE's capability and requirement, actual channel condition from multiple candidate beams. Thus, particular mechanism is required for activation of enhanced PDCCH transmission, where implicit activation scheme may be used on account of low signalling overhead.

In Release 15, for one CORESET, a list of TCI-State is configured as candidates for indicating quasi co-location information of the DM-RS antenna port for PDCCH reception. The network may indicate a TCI state for PDCCH reception for a CORESET of a serving cell by sending the TCI state indication for UE-specific PDCCH MAC CE. Then, the MAC entity indicates to lower layers the information regarding the TCI state indication for UE-specific PDCCH MAC CE.

The detailed information for this UE-specific PDCCH MAC CE 900 is shown in FIG. 9A. In this example, the PDCCH MAC CE 900 includes a Severing Cell ID 902 of 5 bits, a CORSET ID 904 of 4 bits, a TCI State ID 906. Only one TCI state ID is indicated for quasi co-location information of the DM-RS port for PDCCH reception. It cannot provide enough TCI information in case of multiple beam/ TRP transmission, where multiple sets of TCI information are required. In fact, the number of activated TCI states can be exploit to provide information whether enhanced PDCCH transmission from multiple TRPs is used.

For enhanced PDCCH transmission with at least one of the above disclosed resource mapping scheme, multiple beams are transmitted from multiple TRPs. Thus, two or more TCI states are required to indicate quasi co-location information of the DM-RS port for PDCCH reception. Moreover, the list of TCI-State for activation of multiple TCI states may be the same or different since the TCI states are linked with candidate beams from different TRPs. Shown in FIG. 9B is an example of TCI State Indication for UE-specific PDCCH MAC CE 900a in the case of enhanced PDCCH transmission with at least one of the above disclosed resource mapping schemes, where TCI state 1 906 and TCI state 2 908 are used to indicate TCI information for enhanced PDCCH transmission from two TRPs.

In some examples, the number of TCI states is only one when the conventional PDCCH transmission scheme from a single TRP is used. The number of TCI states is two or more when the enhanced PDCCH transmission scheme with at least one of the above disclosed resource mapping schemes is used. In other words, when two or more TCI states are activated, the enhanced PDCCH transmission scheme is implicitly assumed at the UE's side. For the transient period before the activation of multiple TCI states and the period without activation of multiple TCI states, the conventional PDCCH transmission scheme specified in Release 15 may be assumed at the UE's side.

Figure 10:
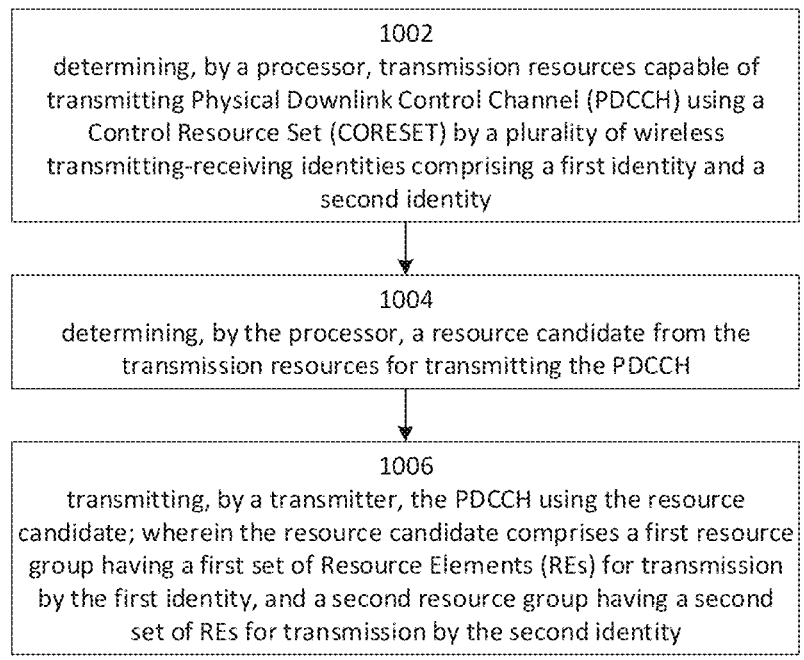
FIG. 10 is a flow chart illustrating steps of transmission of enhanced PDCCH with multiple beams from multiple TRPs by NE in accordance with some implementations of the present disclosure.

FIG. 10 is a flow chart illustrating steps of transmission of enhanced PDCCH with multiple beams from multiple TRPs by NE in accordance with some implementations of the present disclosure.

At step 1002, the processor 302 of the NE 300 determines transmission resources capable of transmitting Physical Downlink Control Channel (PDCCH) using a Control Resource Set (CORESET) by a plurality of wireless transmitting-receiving identities including a first identity and a second identity (e.g., TRP 1 and TRP 2).

At step 1004, the processor 302 determines a resource candidate from the transmission resources for transmitting the PDCCH.

At step 1006, the transmitter 314 transmits the PDCCH using the resource candidate, where the resource candidate includes a first resource group having a first set of Resource Elements (REs) for transmission by the first identity, and a second resource group having a second set of REs for transmission by the second identity.

In some embodiments, the processor 302 further determines a plurality of resource candidates from the transmission resources for transmitting the PDCCH; each one of the resource candidates includes a first resource group having a first set of REs for transmission by the first identity, and a second resource group having a second set of REs for transmission by the second identity; and the transmitter transmits the PDCCH using one of the resource candidates.

In some embodiments, the resource candidate consists of a plurality of Resource Element Groups (REGs) as basic units, each REG including a plurality of REs; and the REGs are concatenated in groups, each of which includes a first REG for transmission by the first identity, and a second REG for transmission by the second identity. The groups of REGs are further arranged into superset groups, each superset group consisting of one or more REG bundles that are REGs bundled together according to a bundling size defined by a higher layer; and the superset groups are further arranged into Control Channel Elements (CCEs), each CCE consisting of a pre-defined number of REGs.

In some embodiments, the resource candidate consists of a plurality of Resource Element Group (REG) bundles as basic units, each REG bundle consisting of a plurality of REGs that are bundled together according to a bundling size defined by a higher layer; and the REG bundles are concatenated in groups, each of which includes a first REG bundle for transmission by the first identity, and a second REG bundle for transmission by the second identity. The groups are further arranged into Control Channel Elements (CCEs), each CCE consisting of a pre-defined number of REGs.

In some embodiments, the resource candidate consists of a plurality of Control Channel Elements (CCEs) as basic units, each CCE including a pre-defined number of REGs associated with one of the wireless transmitting-receiving identities; and the CCEs are concatenated in groups, each of which includes a first CCE for transmission by the first identity, and a second CCE by the second identity.

Each one of the REGs, each one of the REG bundles, and/or each one of the CCEs are associated with an identification number, and the REGs, REG bundles and/or CCEs are arranged in an increasing order of corresponding identification numbers.

In some embodiments, the transmitter 312 further transmits a mapping scheme selection signal indicating the basic units of the resource candidate. In some embodiments, the transmitter 312 further transmits a plurality of activated Transmission Configuration Indication (TCI) states for the CORESET, to implicitly indicate that more than one wireless transmitting-receiving identities are used for transmission of the PDCCH.

Figure 11:
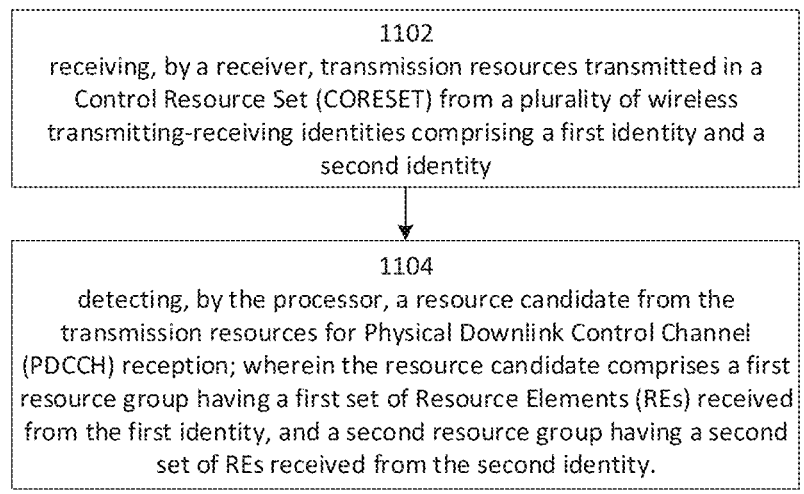
FIG. 11 is a flow chart illustrating steps of reception of enhanced PDCCH transmission with multiple beams from multiple TRPs by UE in accordance with some implementations of the present disclosure.

FIG. 11 is a flow chart illustrating steps of reception of enhanced PDCCH transmission with multiple beams from multiple TRPs by UE in accordance with some implementations of the present disclosure.

At step 1102, the receiver 214 of the UE 200 receives transmission resources transmitted in a Control Resource Set (CORESET) from a plurality of wireless transmitting-receiving identities including a first identity and a second identity (e.g., TRP 1 and TRP 2).

At step 1104, the processor 202 detects a resource candidate from the transmission resources for Physical Downlink Control Channel (PDCCH) reception; where the resource candidate includes a first resource group having a first set of Resource Elements (REs) received from the first identity, and a second resource group having a second set of REs received from the second identity.

In some embodiments, the receiver 214 further receives a mapping scheme selection signal indicating the basic units of the resource candidate. In some embodiments, the receiver 214 further receives a plurality of activated Transmission Configuration Indication (TCI) states for the CORESET; and the processer 202 infers that the PDCCH is transmitted from more than one wireless transmitting-receiving identities.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Embodiments may be practiced in other specific forms. The described embodiments are to be considered in all respects only as illustrative and not restrictive. The scope is, therefore, indicated by the appended claims rather than by the foregoing description. All changes which come within the meaning and range of equivalency of the claims are to be embraced within their scope.

What is claimed is:

1. An apparatus for wireless communication, comprising:
at least one memory; and
at least one processor coupled with the at least one memory and configured to cause the apparatus to:
   determine transmission resources capable of transmitting Physical Downlink Control Channel (PDCCH) using a Control Resource Set (CORESET) by a plurality of wireless transmitting-receiving identities comprising a first identity and a second identity;
   determine a resource candidate from the transmission resources for transmitting the PDCCH, wherein the resource candidate comprises a first resource group having a first set of Resource Elements (REs) for transmission by the first identity, and a second resource group having a second set of REs for transmission by the second identity;

transmit the PDCCH using the resource candidate; and transmit Medium Access Control Control Element (MAC CE) with a plurality of activated Transmission Configuration Indication (TCI) states for the CORESET, wherein the plurality of activated TCI states are used for transmission of the PDCCH.

2. The apparatus of claim 1, wherein the at least one processor is configured to cause the apparatus to determine a plurality of resource candidates from the transmission resources for transmitting the PDCCH; each one of the resource candidates comprises a first resource group having a first set of REs for transmission by the first identity, and a second resource group having a second set of REs for transmission by the second identity; and transmit the PDCCH using one of the resource candidates.

3. The apparatus of claim 2, wherein the at least one processor is configured to cause the apparatus to transmit a mapping scheme selection signal indicating basic units of the one of the resource candidates.

4. The apparatus of claim 1, wherein the resource candidate includes a plurality of Resource Element Groups (REGs) as basic units, each REG comprising a plurality of REs; and the REGs are concatenated in groups, each of which comprises a first REG for transmission by the first identity, and a second REG for transmission by the second identity.

5. The apparatus of claim 4, wherein the groups of REGs are further arranged into superset groups, each superset group comprising of one or more REG bundles that are each one or more REGs bundled together according to a bundling size defined by a higher layer; and the superset groups are further arranged into Control Channel Elements (CCEs), each CCE comprising a pre-defined number of REGs.

6. The apparatus of claim 4, wherein each one of the REGs are arranged in an increasing order of corresponding identification numbers.

7. The apparatus of claim 1, wherein the resource candidate includes a plurality of Resource Element Group (REG) bundles as basic units, each REG bundle comprising a plurality of REGs that are bundled together according to a bundling size defined by a higher layer; and the REG bundles are concatenated in groups, each of which comprises a first REG bundle for transmission by the first identity, and a second REG bundle for transmission by the second identity.

8. The apparatus of claim 7, wherein the groups are further arranged into Control Channel Elements (CCEs), each CCE comprising a pre-defined number of REGs.

9. The apparatus of claim 1, wherein the resource candidate a plurality of Control Channel Elements (CCEs) as basic units, each CCE comprising a pre-defined number of REGs associated with one of the wireless transmitting-receiving identities; and the CCEs are concatenated in groups, each of which comprises a first CCE for transmission by the first identity, and a second CCE by the second identity.

10. The apparatus of claim 1, wherein the activated TCI states for the CORESET implicitly indicate that more than one wireless transmitting-receiving identities are used for transmission of the PDCCH.

11. The apparatus of claim 1, wherein the plurality of activated TCI states used for transmission of the PDCCH are from a same list of TCI-States.

12. An apparatus for wireless communication, comprising:

at least one memory; and at least one processor coupled with the at least one memory and configured to cause the apparatus to:

receive transmission resources transmitted in a Control Resource Set (CORESET) from a plurality of wireless transmitting-receiving identities comprising a first identity and a second identity, and Media Access Control (MAC) Control Element (CE) with a plurality of activated Transmission Configuration Indication (TCI) states for the CORESET, wherein the plurality of activated TCI states are used for a Physical Downlink Control Channel (PDCCH) reception; and detect a resource candidate from the transmission resources for the PDCCH reception wherein the resource candidate comprises a first resource group having a first set of Resource Elements (REs) received from the first identity, and a second resource group having a second set of REs received from the second identity.

13. The apparatus of claim 12, wherein the transmission resources comprises a plurality of resource candidates; each one of the resource candidates comprises a first resource group having a first set of REs received from the first identity, and a second resource group having a second set of REs received from the second identity; and the processor further detects one of the resource candidates that is used for transmission of the PDCCH.

14. The apparatus of claim 12, wherein the resource candidate includes a plurality of Resource Element Groups (REGs) as basic units, each REG comprising a plurality of REs; and the REGs are concatenated in groups, each of which comprises a first REG received from the first identity, and a second REG received from the second identity.

15. The apparatus of claim 12, wherein the resource candidate includes a plurality of Resource Element Group (REG) bundles as basic units, each REG bundle comprising a plurality of REGs that are bundled together according to a bundling size defined by a higher layer; and the REG bundles are concatenated in groups, each of which comprises a first REG bundle received from the first identity, and a second REG bundle received from the second identity.

16. The apparatus of claim 12, wherein the resource candidate includes a plurality of Control Channel Elements (CCEs) as basic units, each CCE comprising a pre-defined number of REGs associated with one of the wireless transmitting-receiving identities; and the CCEs are concatenated in groups, each of which comprises a first CCE received from the first identity, and a second CCE by the second identity.

17. The apparatus of claim 12, wherein the plurality of activated TCI states used for transmission of the PDCCH are from a same list of TCI-States.

18. A method, comprising:

determining, by a processor, transmission resources capable of transmitting Physical Downlink Control Channel (PDCCH) using a Control Resource Set (CORESET) by a plurality of wireless transmitting-receiving identities comprising a first identity and a second identity;

determining, by the processor, a resource candidate from the transmission resources for transmitting the PDCCH;

transmitting, by a transmitter, the PDCCH using the resource candidate; and transmitting, by the transmitter, Medium Access Control Control Element (MAC CE) with a plurality of activated Transmission Configuration Indication (TCI)

states for the CORESET, wherein the plurality of activated TCI states are used for transmission of the PDCCH;

wherein the resource candidate comprises a first resource group having a first set of Resource Elements (REs) for transmission by the first identity, and a second resource group having a second set of REs for transmission by the second identity.

19. The method of claim 18, further comprising: transmitting, by the transmitter, a plurality of activated Transmission Configuration Indication (TCI) states for the CORESET, to implicitly indicate that more than one wireless transmitting-receiving identities are used for transmission of the PDCCH.

20. The method of claim 18, wherein the plurality of activated TCI states used for transmission of the PDCCH are from a same list of TCI-States.

* * * * *